(12) United States Patent
Srivastava et al.

(10) Patent No.: US 9,348,891 B2
(45) Date of Patent: May 24, 2016

(54) ONLINE DATA FUSION

(75) Inventors: Divesh Srivastava, Summit, NJ (US); Xin Dong, Morristown, NJ (US); Xuan Liu, Singapore (SG)

(73) Assignee: AT&T Intellectual Property I, L.P., Atlanta, GA (US)

( * ) Notice: Subject to any disclaimer, the term of this patent is extended or adjusted under 35 U.S.C. 154(b) by 860 days.

(21) Appl. No.: 13/311,034

(22) Filed: Dec. 5, 2011

(65) Prior Publication Data
US 2013/0144843 A1    Jun. 6, 2013

(51) Int. Cl.
*G06F 17/30* (2006.01)

(52) U.S. Cl.
CPC .............................. *G06F 17/30634* (2013.01)

(58) Field of Classification Search
None
See application file for complete search history.

(56) References Cited

U.S. PATENT DOCUMENTS

| | | | |
|---|---|---|---|
| 6,484,161 B1 * | 11/2002 | Chipalkatti et al. | |
| 7,953,720 B1 * | 5/2011 | Rohde et al. | 707/706 |
| 8,185,448 B1 * | 5/2012 | Myslinski | 705/26.1 |
| 2009/0313204 A1 * | 12/2009 | Van Zon | 706/52 |
| 2010/0293129 A1 * | 11/2010 | Dong et al. | 706/52 |
| 2011/0276310 A1 * | 11/2011 | Schlicht | 702/181 |
| 2012/0078837 A1 * | 3/2012 | Bagchi et al. | 706/52 |

OTHER PUBLICATIONS

L. Berti-Equille. Quality Awareness for Managing and Mining Data. PhD thesis, Universite de Rennes 1, 2007.
L. Blanco, V. Crescenzi, P. Merialdo, and P. Papotti, Probabilistic models to reconcile complex data from inaccurate data sources. In CAiSE, 2010.
J. Bleiholder, S. Khuller, F. Naumann, L. Raschid, and Y. Wu. Query planning in the presence of overlapping sources. In EDBT, 2006.
X. L. Dong, L. Berti-Equille, Y. Hu, and D. Srivastava. Global detection of complex copying relationships between sources. PVLDB, 2010.
X. L. Dong, L. Berti-Equille, and D. Srivastava. Integrating conflicting data: the role of source dependence. PVLDB, 2(1), 2009.
X. L. Dong, L. Berti-Equille, and D. Srivastava. Truth discovery and copying detection in a dynamic world. PVLDB, 2(1), 2009.
X. L. Dong and F. Naumann. Data fusion—resolving data conflicts for integration. PVLDB, 2009.
A. Galland, S. Abiteboul, A. Marian, and P. Senellart. Corroborating information from disagreeing views. In WSDM, 2010.
J. M. Hellerstein, P. J. Hass, and H. J. Wang. Online aggregation, In SIGMOD, 2007.
G. A. Mihaila, L. Raschid, and M.-E. Vidal. Using quality of data metadata for source selection and ranking. In WebDB, 2000.

(Continued)

*Primary Examiner* — Alex Gofman
*Assistant Examiner* — Umar Mian
(74) *Attorney, Agent, or Firm* — Hartman & Citrin LLC

(57) ABSTRACT

An online data fusion system receives a query, probes a first source for an answer to the query, returns the answer from the first source, refreshes the answer while probing an additional source, and applies fusion techniques on data associated with an answer that is retrieved from the additional source. For each retrieved answer, the online data fusion system computes the probability that the answer is correct and stops retrieving data for the answer after gaining enough confidence that data retrieved from the unprocessed sources are unlikely to change the answer. The online data fusion system returns correct answers and terminates probing additional sources in an expeditious manner without sacrificing the quality of the answers.

20 Claims, 14 Drawing Sheets

(56) References Cited

OTHER PUBLICATIONS

A. D. Sarma, X. L. Deng, and A. Y. Halevy. Data integration with dependent sources. In EDBT, 2011.

M. A. Suryanto, E.-P. Lim, A. Sun, and R. Chiang. Quality-aware collaborative question answering: Methods and evaluation. In WSDM, 2009.

M. Wu and A. Marian. A framework for corroborating answers from multiple web sources. Inf. Syst., 36(2):431-449, 2011.

X. Yin, J. Han, and P. S. Yu. Truth discovery with multiple conflicting information providers on the web. IEEE Trans. Knowl. Data Eng., 20:796-808, 2008.

X. Liu, X.L. Dong, B.C. Ooi, and D. Srivsatava. Online Data Fusion. Proceedings of the VLDB Endowment, vol. 4, No. 12, Aug. 29-Sep. 3, 2011.

* cited by examiner

| Time | Output | | Probed source |
|---|---|---|---|
| | Answer | Probability | Probability range | |
| Sec 1 | TX | .4 | (0,1) | $S_9$ |
| Sec 2 | TX | .22 | (0,1) | $S_5$ |
| Sec 3 | NJ | .94 | (0,1) | $S_3$ |
| Sec 4 | NJ | .84 | (0,1) | $S_4$ |
| Sec 5 | NJ | .92 | (0,1) | $S_6$ |
| Sec 6 | NJ | .97 | (.001,1) | $S_2$ |
| Sec 7 | NJ | .97 | (.014,1) | $S_1$ |
| Sec 8 | NJ | .98 | (.45,1) | $S_7$ |

| Source | Independent vote count | Dependent vote count |
|---|---|---|
| $S_1$ | $\ln\frac{49*.3}{1-.3} = 3$ | $3*1 = 3$ |
| $S_2$ | $\ln\frac{49*.5}{1-.5} = 4$ | $4*(1-.8) = .8$ |
| $S_3$ | $\ln\frac{49*.75}{1-.75} = 5$ | $5*1 = 5$ |
| $S_4$ | $\ln\frac{49*.3}{1-.3} = 3$ | $3*1 = 3$ |
| $S_5$ | $\ln\frac{49*.75}{1-.75} = 5$ | $5*1 = 5$ |
| $S_6$ | $\ln\frac{49*.5}{1-.5} = 4$ | $4*(1-.8) = .8$ |
| $S_7$ | $\ln\frac{49*.3}{1-.3} = 3$ | $3*1 = 3$ |
| $S_8$ | $\ln\frac{49*.5}{1-.5} = 4$ | $4*(1-.8) = .8$ |
| $S_9$ | $\ln\frac{49*.75}{1-.75} = 5$ | $5*(1-.8) = 1$ |

Input    : $S$ sources in decreasing order of their accuracy;
           $\bar{D}$ queried data items
Output : True values for $\bar{D}$; for each returned value, return in
           addition $expPr(v)$, $minPr(v)$ and $maxPr(v)$.
// Initialization
1  $stop[D \in \bar{D}] \leftarrow$ false; $vote[D \in \bar{D}][v \in \mathcal{D}(d)] \leftarrow 0$;
2  $remain \leftarrow \sum_{S \in \mathcal{S}} \alpha(S)$;
3  while $\exists D \in \bar{D}$ s.t. $stop[D] = false$ do
        // Probe the next source in the list
4     $S \leftarrow$ the next source in the list;
5     $remain \leftarrow remain - \alpha(S)$;
6     foreach $D \in \bar{D}$ do
7        if $!stop[D]$ then
            // 1. Truth finding
8           $vote[D][S(d)] \leftarrow vote[D][S(d)] + C^{\perp}(S)$; // $S(d)$ is
              the value provided by $S$ on $D$
9           find the value $v_1$ with the maximum vote count and $v_2$
              with the top-2 vote count;
            // 2. Probability computation
10          compute $expPr(v_1)$, $maxPr(v_1)$, $minPr(v_1)$
              according to $vote[D]$ and $remain$;
            // 3. Termination justification
11          compute $Pr(v_2)$ according to $vote[D]$;
12          if $minPr(v_1) > Pr(v_2)$ then
13             $stop[D] \leftarrow$ true;

14    Refresh answers in the output;

*FIG. 5*

1  $cV[S][D] \leftarrow cV[S][D] * \Pi_{S_p \in P, S_p(D) = S(D)}$
2  $(1-p(S \rightarrow S_p))$; // $S(D)$ is the value provided by $S$ on $D$.
3  $cVote[D][S(D)] \leftarrow cVote[D][S(D)] + cV[S][D]$;
4  foreach $S_c \in \bar{C}$ do
5     if $S_c(D) \neq S(D)$ then
6        $\Delta \leftarrow \frac{cV[S_c][D]p(S_{st} \rightarrow S)}{1-p(S_{st} \rightarrow S)}$;
7        $cV[S_c][D] \leftarrow cV[S_c][D] + \Delta$;
8        $cVote[D][S_c(D)] \leftarrow cVote[D][S_c(D)] + \Delta$;

*FIG. 6*

1  $sV[S][D] \leftarrow V_a(S)\Pi_{S_a \in A, S_a(D) = S(D)}$
2  $(1 - \rho(S \rightarrow Pa(S, S_a)))$; // $Pa(S, S_a)$ is the parent of $S$ on the copying path to $S_a$.
3  $sVote[D][S(D)] \leftarrow sVote[S_d][S(D)] + sV[S][D]$;
4  if $\exists S_a \in \bar{A}, S_d(D) \neq S_a(D) \& \& \rho(S_d \rightarrow Pa(S_d, S)) \neq \emptyset$ then
5  $\quad \Delta \leftarrow sV[S_d][D]\rho(S_d \rightarrow Pa(S_d, S))$;
6  $\quad sV[S_d][D] \leftarrow sV[S_d][D] - \Delta$;
7  $\quad sVote[D][S_d(D)] \leftarrow sVote[D][S_d(D)] - \Delta$;
8  else if $\exists S_a \in \bar{A}, S_d(D) = S_a(D) \& \& S_d(D) \neq S(D)$ then
9  $\quad \Delta \leftarrow \dfrac{sV[S_d][D]\rho(S_d \rightarrow Pa(S_d, S))}{1 - \rho(S_d \rightarrow Pa(S_d, S))}$;
10 $\quad sV[S_d][D] \leftarrow sV[S_d][D] + \Delta$;
11 $\quad sVote[D][S_d(D)] \leftarrow sVote[D][S_d(D)] + \Delta$;

*FIG. 7*

| Source | NY | NJ |
|--------|-----|-----|
| $S_3$ | 0 | 1 |
| $S_2$ | .8 | 5 |
| $S_1$ | 3.8 | 5 |

(a) Conservative approach.

*FIG. 8A*

| Source | NY | NJ |
|--------|-----|-----|
| $S_3$ | 0 | 5 |
| $S_2$ | 4 | 5 |
| $S_1$ | 3.8 | 5 |

(b) Pragmatic approach.

Input   : $v$ the value; $D$ the data item;
                   $\bar{S}$ probed sources; $S$ all sources;
                   $sV$ pragmatic vote counts of each source,
                   $remain$ sum of vote counts of the unseen sources.
    Output : $minPr(v)$.
1  $vote[v \in \mathcal{D}(D)] \leftarrow 0$;
2  foreach $S \in \bar{S}$ do
3      if *S's parents are all probed* then
4          $vote[S(D)] \leftarrow vote[S(D)] + sV[S][D]$;
5      else if $S(D) = v$ then
6          $temp = \min_{S_a \text{ is an ancestor of } S} V_i(S_a) +$
              $sV[S][D](1 - \rho(S \to Pa(S, S_a)))$;
7          if $temp > sV[S][D]$ then
8               $vote[v] \leftarrow vote[v] + sV[S][D]$;
9          else
10             $vote[v] \leftarrow vote[v] + temp$;
11     else
12         $vote[S(D)] \leftarrow vote[S(D)] +$
13         $C^{\perp}(S)\Pi_{S_p(D)=S(D)}(1 - \rho(S \to S_p))$;
14 find the value $v_{max} \neq v$ with the maximum vote count;
15 $vote[v_{max}] \leftarrow vote[v_{max}] + remain$;
16  return $\dfrac{e^{cV[D][v]}}{\sum_{v_0 \in \mathcal{D}(D)} e^{cV[D][v_0]}}$;

*FIG. 9*

```
Input   : S ordered sources; D̄ queried data items.
Output  : True values for D̄; for each returned value, return in
          addition expPr(v), minPr(v) and maxPr(v).
1  stop[D ∈ D̄] ← false;
2  cVote[D ∈ D̄][v ∈ D(D)] ← 0;
3  sVote[D ∈ D̄][v ∈ D(D)] ← 0;
4  sV[S ∈ S̄][D ∈ D̄] ← C⊥(S);
5  remain ← Σ_{S∈S̄} α(S);
6  while ∃D ∈ D̄ s.t. stop[D] =false do
7  |   remain ← remain − α(S);
8  |   C̄ ← probed children of S;
9  |   P̄ ← probed parents of S;
10 |   Ā ← closest probed ancestors of S;
11 |   S_d ← closest probed descendant of S;// There is only one such
       descendant according to the co-copier condition.
12 |   cV[S][D] ← C⊥(S) · Π_{S_p is unseen parent of S}(1 − ρ(S →
       S_p));
13 |   foreach D ∈ D̄ do
14 |   |   if !stop[D] then
               // 1. Truth finding
15 |   |       CONSERVATIVEVOTECOUNT(S, D, cV, cVote);
16 |   |       PRAGMATICVOTECOUNT(S, D, sV, sVote);
17 |   |       find the value v_1 with the maximum vote count and v_2
               with the top-2 vote count; // Either conservative or
               pragmatic
               // 2. Probability computation
18 |   |       expPr(v_1) ←
               Avg( e^{cV[D][v_1]} / Σ_{v∈D(D)} e^{cV[D][v]} , e^{sV[D][v_1]} / Σ_{v∈D(D)} e^{sV[D][v]} );
               Pr(v_2) ← e^{sV[D][v_2]} / Σ_{v∈D(D)} e^{sV[D][v]};
19 |   |       minPr(v_1) ← MINPR(v_1, d, S̄, S, sV, remain);
20 |   |       maxPr(v_1) ← MAXPR(v_1, d, S̄, S, sV, remain);
               // 3. Termination justification
21 |   |       if minPr(v_1) > expPr(v_2) then
22 |   |       |   stop[D] ← true;
23 |   Refresh answers in the output;
```

*FIG. 10*

```
Input  : S set of sources.
Output : Ordering of the sources.
1  S̄ ← ∅;
2  vote[S ∈ S] ← C⊥(S);
3  while S̄ ≠ S do
4      max ← -∞; S₀ ← null;
5      foreach S ∈ S do
6          if vote[S] > max && S satisfies the co-copier condition
           then
7              max ← vote[S]; S₀ ← S;
8      Add S₀ to the end of S̄;
9      foreach S ∈ S - S̄ && S is an ancestor or descendant of S₀ do
10         Vote[S] ← C(S̄ ∪ {S}) - C(S̄);
11 return S̄;
```

FIG. 11

| Method | Rnd | $S_1$ | $S_2$ | $S_3$ | $S_4$ | $S_5$ | $S_6$ | $S_7$ | $S_8$ | $S_9$ |
|---|---|---|---|---|---|---|---|---|---|---|
| Fixed | | 3 | .8 | 1 | 3 | 5 | .16 | 3 | .8 | 1 |
| Cond | 1 | 3 | 4 | 5 | 3 | 5 | 4 | 3 | 4 | 5 |
| | 4 | -1 | 0 | - | 3 | - | .8 | -1 | 4 | - |
| | 5 | -1 | 0 | - | - | - | .16 | -1 | 4 | - |
| | 6 | -1 | 0 | - | - | - | - | -1 | 4 | - |
| | 7 | -.2 | - | - | - | - | - | -1 | 4 | - |
| | 8 | - | - | - | - | - | - | -1 | 4 | - |

ONLINE DATA FUSION

BACKGROUND

The World Wide Web ("the Web") contains a significant volume of structured data in various domains such as finance, technology, entertainment, and travel. Typically, this data exists in Web databases, hypertext markup language ("HTML") tables, HTML lists, and the like. Advances in data integration technologies have made it possible to query such data. For example, a vertical search engine accepts queries on the schema it provides, retrieves answers from various sources, and returns the union of the answers.

Different Web sources often provide information for the same data item. However, since dirty and erroneous information exists on the Web, data retrieved from different sources is often in conflict. For example, in data retrieved from different websites there may be different addresses for the same restaurant, different business hours for the same supermarket at the same location, different closing quotes for the same stock on the same day, and so on. In addition, the Web has made it convenient to copy data between sources, so inaccurate data can quickly propagate to other sources. Integration systems that merely take the union of the answers from various sources can thus return conflicting answers, leaving the difficult decision of which answers are correct to end users.

Recently, a variety of data fusion techniques have been proposed to resolve conflicts from different sources and create a consistent and clean set of data. Data fusion techniques aim to discover the true values that reflect the real world. To achieve this goal, these techniques not only consider the number of providers for each value, but also reward values from trustworthy sources and discount votes from copiers. Such techniques are designed for offline data aggregation. However, aggregating all information on the Web and applying fusion offline is infeasible because of the sheer volume of Web data and the frequent update of Web data. On the other hand, the whole process can be quite time-consuming and inappropriate for query answering at runtime.

SUMMARY

Concepts and technologies are described herein for online data fusion. In accordance with some of the concepts and technologies disclosed herein, an online data fusion system receives a query, probes a first source for an answer to the query, returns the answer from the first source, refreshes the answer while probing an additional source, and applies fusion techniques on data associated with an answer that is retrieved from the additional source. For each retrieved answer, the online data fusion system computes the probability that the answer is correct and stops retrieving data for the answer after gaining enough confidence that data from the unprocessed sources are unlikely to change the answer. The online data fusion system terminates probing additional sources in an expeditious manner without sacrificing the quality of the answers.

According to one aspect, a method for resolving conflicts using an online data fusion system includes receiving answers to a query from at least two probed sources, computing a probability that each answer is correct, terminating without probing the additional source when the online data fusion system gains enough confidence that probing the additional source is unlikely to change the answers, and providing an answer of the answers in response to the query. In some embodiments, computing the probability that each answer is correct is based upon a copying relationship between at least two of the probed sources, a coverage of a probed source, and/or a source quality of a probed source.

In some embodiments, the method further comprises receiving an ordered list of sources specifying an order in which to probe sources.

In some embodiments, terminating without probing the additional source is based upon whether a termination condition is satisfied. In some embodiments, the termination condition is configurable to decrease the time needed to satisfy the termination condition, thereby facilitating providing the answer of the answers in response to the query in an expeditious manner.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a table illustrating an output including an answer, a probability, and a probability range provided by a plurality of probed sources at various time points, according to an illustrative embodiment.

FIG. 4 is a table illustrating an independent vote count and a dependent vote count for each of a plurality of sources, according to an illustrative embodiment.

FIGS. 5-7 are diagrams illustrating pseudo-code for algorithms for implementing various embodiments presented herein.

FIGS. 8A and 8B are tables illustrating vote counts for example answers provided by various sources using a conservative approach and a pragmatic approach, respectively, according to an illustrative embodiment.

FIGS. 9-11 are diagrams illustrating pseudo-code for algorithms for implementing various embodiments presented herein.

FIG. 12 is a table illustrating vote counts computed in source ordering, in which maximum vote counts in each round of a pragmatic approach to vote counting are in bold, according to an illustrative embodiment.

DETAILED DESCRIPTION

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, mobile devices, wireless devices, multiprocessor systems, microprocessor-based or programmable consumer electronics, minicomputers, mainframe computers, and the like.

Figure 1:
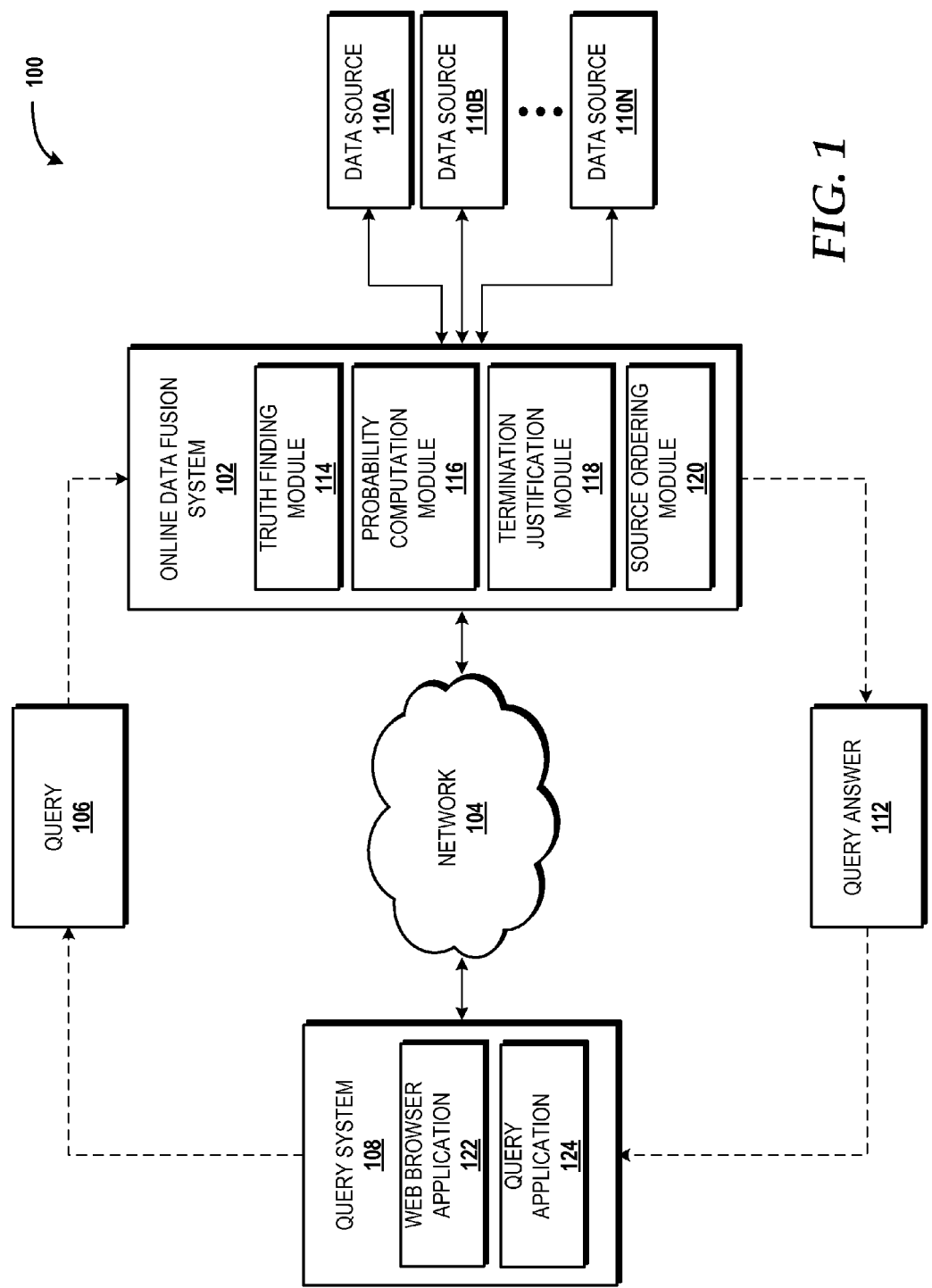
FIG. 1 is a diagram illustrating an illustrative operating environment for implementing various embodiments presented herein.

Referring now to the drawings, in which like numerals represent like elements throughout the several figures, FIG. 1 illustrates aspects of an operating environment 100 in which various embodiments presented herein may be implemented. The operating environment 100 shown in FIG. 1 includes an online data fusion system 102 operating on or in communication with a network 104 to receive a query 106 from a query system 108 and to respond to the query 106 by probing one or more data sources 110A, 110B, 110N ("data sources 110") and returning a query answer 112 obtained from one of the data sources 110 in an expeditious manner without sacrificing the quality of the query answer 112. Instead of waiting for data fusion to complete and returning all answers in a batch, as is done with traditional data fusion systems, the online data fusion system 102, in some embodiments, starts with returning the answers received from a first probed data source of the data sources 110, then refreshes the answers as the online data fusion system 102 probes more of the data sources 110. For each returned answer, the online data fusion system 102 shows the probability that the answer is correct based upon the retrieved data and knowledge of the source quality. In some embodiments, knowledge of the source quality is not used, although the answers can be further refined using such knowledge. When the online data fusion system 102 gains enough confidence that data from unprobed (unseen) data sources of the data sources 110 are unlikely to change the returned answers, the online data fusion system 102 terminates without necessarily probing all available data sources 110. Thus, the online data fusion system 102 can significantly reduce the latency in query answering, as the embodiments described herein demonstrate.

The online data fusion system 102 returns answers as it incrementally probes the data sources 110, and terminates when it determines that data from the remaining unprobed data sources are unlikely to change the answers. In the illustrated embodiment, the online data fusion system 102 includes four components: a truth finding module 114, a probability computation module 116, a termination justification module 118, and a source ordering module 120 to perform various operations as described in detail herein below. Although the modules 114, 116, 118, 120 are illustrated as discrete modules, the modules 114, 116, 118, 120, in some embodiments, are combined in one or more application programs and executed by the online data fusion system 102 to perform the various operations described herein.

In some embodiments, the online data fusion system 102 is a personal computer ("PC"), such as a desktop, tablet, or laptop computer system. In some embodiments, the online data fusion system 102 is another type of computing system, such as a server computer, a handheld computer, a netbook computer, an embedded computer system, a personal digital assistant, a mobile telephone device, a smartphone device, a video game system, a portable video game system, an Internet search system, a network search system, an enterprise search system, combinations thereof, and the like.

In the illustrated embodiment, the query system 108 includes a Web browser application 122 and a query application 124. The illustrated query system 108 executes the Web browser application 122 and/or the query application 124 to facilitate input of the query 106. In some embodiments, the Web browser application 122 establishes a connection to the online data fusion system 102 via the network 104. Through the connection, the Web browser application 122 can request a Web page, Web form, or other component for facilitating input of the query 106. Through the Web page, Web form, or other component, a user of the query 106 can specify one or more query terms to be utilized by the online data fusion system 102 to probe the data sources 110 for the query answer 112. In some embodiments, the query application 124 provides functionality similar to the Web page, Web form, or other component that is accessed by the Web browser application 122, but outside the context of a Web browser, such as via a desktop widget or standalone query application. In some embodiments, the query application 124 is a plug-in, add-on, or extension to the Web browser application 122.

The network 104 may be, may communicate with, or may include a circuit-switched core network of a mobile telecommunications network, a packet-switched core network of a mobile telecommunications network, the Internet, an internet, an intranet, an enterprise network, a local area network, a wide area network, a metropolitan area network, an IP multimedia subsystem ("IMS") network, any combination thereof, and the like. Although the data sources 110 are illustrated as being directly in communication with the online data fusion system 102, the data sources 110 may alternatively or additionally be in communication with the online data fusion system 102 through the network 104 and/or one or more other networks (not shown).

FIG. 1 illustrates a single online data fusion system 102, a single network 104, a single query 106, a single query system 108, a single truth finding module 114, a single probability computation module 116, a single termination justification module 118, a single source ordering module 120, a single query answer 112, a single web browser application 122, and a single query application 124. It should be understood, however, that some implementations of the operating environment 100 may include multiples of one or more of these elements. Thus, the illustrated embodiments should be understood as being illustrative, and should not be construed as being limiting in any way, unless expressly indicated.

Figure 2:
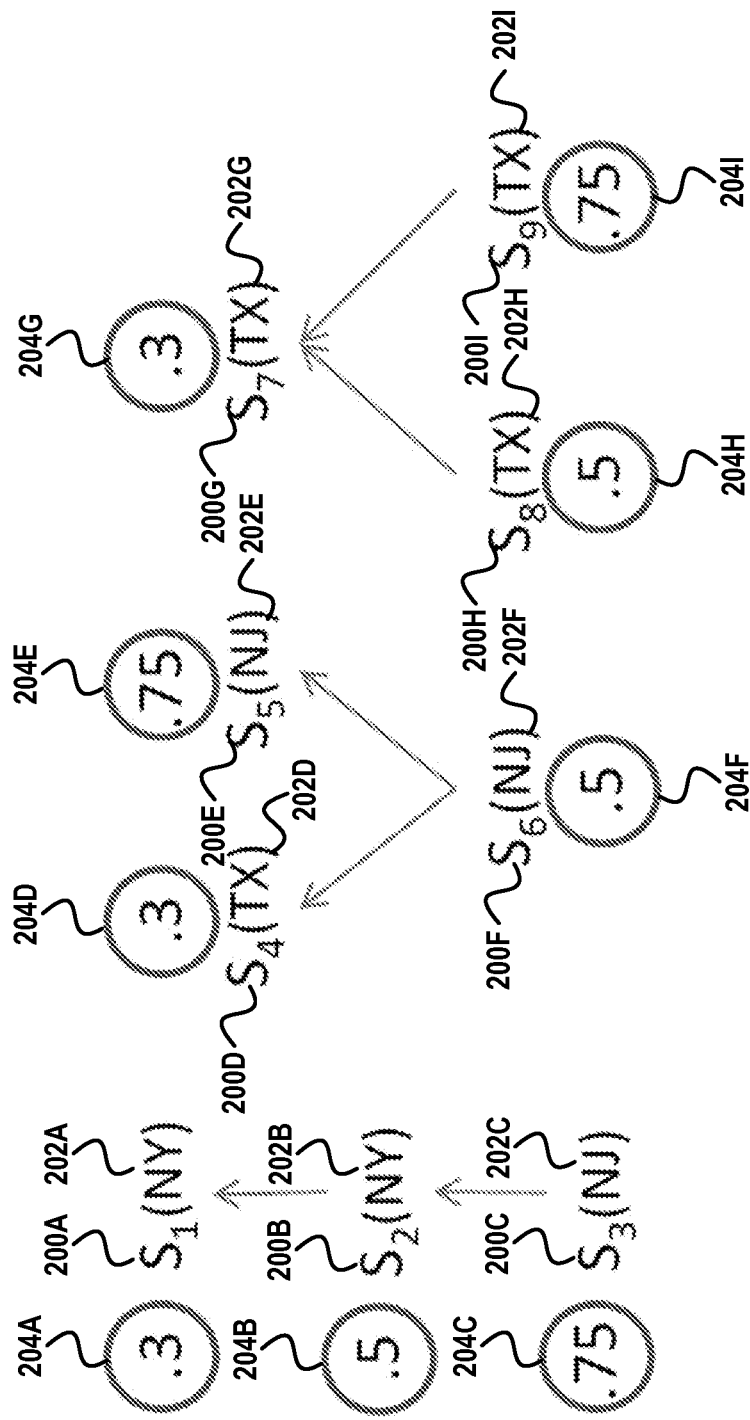
FIG. 2 is a diagram illustrating various sources, answers provided by each of the various sources in response to a query, and the accuracy of the answers provided by each of the various sources, according an illustrative embodiment.

Referring now to FIG. 2, a diagram illustrating data sources 200A-200I, answers 202A-202I provided by each of the data sources 200A-200I in response to a query, and an accuracy 204A-204I of the answers 202A-202I provided by each of the data sources 200A-200I will be described, according to an illustrative example that is used throughout the remaining description. As illustrated in FIG. 2, for each data source 200A-200I an answer it provides for a query is indicated in parentheses and its accuracy for the answer is provided in a circle. An arrow from S to S' means that S copies some data from S'. In other words, S and S' have a copying relationship.

In the illustrated example, a query asking where something is has been sent to each of the data sources 200A-200I. For example, the query may be "Where is the Washington Monument located?" or similar. This query is assumed to be directed to a stationary object, such that the answer to where the something is based upon a fact that the something is located in a particular place, not a transient notion of something that is mobile and may be located in any number of locations at a particular point in time. Thus, the query used in the illustrated example, the query 106 illustrated in FIG. 1, and the other queries referenced herein, in some embodiments, are directed to, but not limited to, finding information based in fact. For instance, the location of the Washington Monument is a fact that can be obtained from various data sources. Similarly, the final score of a particular Super Bowl is a fact that can be obtained from various data sources. In contrast, matters of opinion, such as what is the best monument to see when visiting Washington, D.C., are not facts. It should be understood that the query need not be made in the form of a question, and instead may be in the form of one or more keywords or in some other format.

In some embodiments, the query 106 is a select-project query, wherein the select predicates are posed on the key attribute and the key attribute is in the project list. Such queries are used in applications such as vertical search.

In some embodiments, the query 106 is a query that contains predicates on non-key attributes. In these embodiments, the values on the predicates may be wrong, some results may be missed, and/or some additional results may be retrieved. Also in these embodiments, as the online data fusion system 102 probes new data sources, the online data fusion system 102 applies fusion techniques on the predicate attribute of the returned tuples and decides if the value satisfies the predicate.

In some embodiments, the query 106 is a join query. In these embodiments, the join column values are assumed to be accurate and the online data fusion system 102 applies fusion techniques only on the projected attributes.

Also in the illustrated example, the data sources 200A-200I collectively provide three different answers, among which "NJ" is deemed the correct answer to the query. Traditional data integration systems will return all three different answers to the user and rely upon the user to make the final determination as to which of the returned answers is correct. The online data fusion system 102, however, determines which answer is correct, as will be described in greater detail below, thus relieving the previous burdens placed on the user to determine the correct answer from a set of answer results.

Utilizing the illustrated example, the online data fusion system 102 starts with probing data source $S_9$ 200I in accordance with a specified source order. $S_9$ 200I returns "TX" as the answer 202I with a probability 0.4, as illustrated in a table 300 of FIG. 3 for the answer 202I. How data sources are ordered and how the probability is computed is described in detail herein below. The online data fusion system 102 then probes $S_5$ 200E. $S_5$ 200E returns "NJ" as the answer 202E. As a result, the online data fusion system 102 lowers the probability for answer "TX" (or switches to "NJ"). Next, the online data fusion system 102 probes data source $S_3$ 200C. $S_3$ 200C returns "NJ" as the answer 202C. In response to observing "NJ" again, the online data fusion system 102 refreshes the answer to "NJ" with a probability 0.94, as also shown in the table 300. Probing the remaining sources $S_4$ 200D, $S_6$ 200F, $S_2$ 200B, $S_1$ 200A, and $S_7$ 200G does not change the answer, and the probability first decreases but then gradually increases to 0.98 as detailed in the table 300. At this point, the online data fusion system 102 is confident enough that data from data source $S_8$ 200H are unlikely to change the answer and terminates. Thus, the user starts to see the correct answer after three sources are probed rather than waiting until a traditional system completes probing all nine data sources 200A-200I.

Turning back to FIG. 1, the online data fusion system 102, in some embodiments probes new data sources and returns answers, including the query answer 112, to a user that submitted the query 106 via operating the query system 108 with a confidence level that a particular answer is correct. In some embodiments, the confidence level for each answer considers not only the data the online data fusion system 102 has received from the data sources 110, but also the data that the online data fusion system 102 expects to see from the unprobed (unseen) data sources considering the accuracy and copying relationship the unprobed data sources have with the probed data sources. In some embodiments, the query answer 112 includes only the answer for which the online data fusion system 102 has the highest confidence level. In these embodiments, the confidence level for the query answer 112 may or may not be shown to the user.

Online data fusion benefits greatly from fast response and quick answer refreshing. In some embodiments, the online data fusion system 102 is configured to find the answers that are likely to be correct and to compute probabilities for these answers quickly. In some embodiments, the online data fusion system 102 is configured to probe the data sources 110 in an order such that the online data fusion system 102 can return high-quality answers early and terminate fast. A source ordering strategy for quickly converging on a correct answer, computing high probabilities for the answer, and terminating fast is detailed herein below.

While the online data fusion system 102, in some embodiments, is configured to probe the data sources 110 sequentially, the online data fusion system 102, in other embodiments, is configured to probe the data sources 110 in parallel. In embodiments in which the online data fusion system 102 probes the data sources 110 in parallel, doing so can be time-consuming and resource (e.g., bandwidth) intensive for scenarios in which a large number of data sources are probed. The techniques described herein for online data fusion can help choose a set of the large number of data sources that should be probed first to reduce the amount of time and resources consumed by parallel probing.

In some embodiments, the online data fusion system 102 utilizes knowledge of accuracy of the data sources 110 and/or knowledge of copying relationships between the data sources 110 to determine a correct answer. In some embodiments, the online data fusion system 102 is configured to estimate source accuracy by checking correctness of sampled data, and derive copying probabilities by applying various techniques.

The data sources 110 are each configured to provide tuples that describe objects in a particular domain (e.g., book, movie, publication, etc.). An attribute of a particular object instance is referred to herein as a data item (e.g., title of a book, actor in a movie, etc.). It is assumed that schema mapping techniques have been applied to the data included in each of the data sources 110 to resolve attribute-label heterogeneity. It is also assumed that each tuple contains a key attribute that can uniquely identify the object to which the tuple refers. It is considered herein the case in which each non-key data item has a single true value reflecting the real world but the data sources 110 may provide wrong values.

One or more of the data sources 110, in some embodiments, include an accuracy property that is relied upon in data fusion. The accuracy property, as briefly described above with reference to FIG. 2, captures the notion that different data sources may differ in the correctness of the data they provide. Given a source S∈S, the accuracy of the source S, denoted by α (S), is the probability that a value provided by S is correct.

The data sources 110, in some embodiments, include a copying relationship property that is relied upon in data fusion. The copying relationship property captures the notion that a source may copy from other sources. A copier can copy all or a part of data from one or multiple sources, and can additionally provide its own data, referred to herein as independent data. Given sources S, S'∈S, S≠S', the copying probability, denoted by ρ(S→S'), is the probability for each common value that S copies this value from S'. It is assumed that there is no mutual copying between a pair of sources. So, if ρ(S→S')>0, ρ(S'→S)=0.

Data fusion techniques are used by the online data fusion system 102 to consider the accuracy of the data sources 110 and/or the copying relationship between the data sources 110 in truth finding operations performed by the truth finding module 114. In some embodiments, the truth finding module 114 is configured to decide the true value on data item D according to S by performing the following operations.

1. For each source S∈S that provides data on a data item D, the truth finding module 114 computes its independent vote count as $$C\perp(S) = \ln \frac{n \propto (S)}{1 - \propto (S)},$$

where n is the number of wrong values in the domain for D. Thus, a source with a higher accuracy has a higher independent vote count. Assuming copying relationships between different pairs of the data sources 110 are independent, the truth finding module 114 computes the dependent vote count of S on D as $C^{\rightarrow}(S) = C\perp(S)\pi_{S' \in \bar{S}_D(S)}(1-\rho(S \rightarrow S'))$, where $\bar{S}_D(S)$ denotes the set of data sources that provide the same value as S on D. Thus, $C^{\rightarrow}(S)$ is a fraction of the independent vote count according to the copying probability and $C^{\rightarrow}(S) \leq C\perp(S)$ (equal when S independently provides the value).

2. For each value v in the domain of D, denoted by D(D), the truth finding module 114 computes its vote count as the sum of the dependent vote counts of its providers, denoted by C(v). The value with the highest vote count is considered as the true value.

3. In case the probability of a value v being true is to be computed, the truth finding module 114 applies the equation $$Pr(v \mid S) = \frac{e^{C(v)}}{\sum_{v_0 \in D(D)} e^{C(v_0)}}.$$

This equation is derived from Bayesian analysis, wherein $e^{C(v)}$ is proportional to the probability of the observed data conditioned on v being true, and the assumptions that the same a-priori probability for each value being true.

Referring again to the illustrated example of FIG. 2, consider the data sources 200A-200I and assume that for each copying relationship from S to S', ρ(S→S')=0.8. To fuse answers from all the data sources 200A-200I, the truth finding module 114 computes the vote count for each source and obtains the results that are illustrated in a table 400 shown in FIG. 4 (there are 50 values in the domain). It is noted that although $S_3$ 200C is a copier of $S_2$ 200B, $S_3$ 200C provides a different answer so cannot copy this value from $S_2$ 200B.

Thus, $S_3$ 200C has a dependent vote count that is the same as its independent vote count. Similarly, $S_6$ 200F cannot copy its value from $S_4$ 200D, so its vote count is 4*0.2=0.8 rather than 4*0.2²=0.16.

Thus, the vote count of NJ is 5+5+0.8=10.8; the vote count of TX is 3+3+0.8+1=7.8; the vote count of NY is 3+0.8=3.8; and the vote count of the other 47 values is 0. So, NJ is the correct answer with probability $$\frac{e^{10.8}}{e^{10.8} + e^{7.8} + e^{3.8} + e^0 * 47} = .95.$$

It should be noted that if the truth finding module 114 applies naïve voting or only considers source accuracy, it will return TX instead.

For purposes of explanation and not limitation, the online data fusion system 102, and particularly the probability computation module 116, computes the probabilities based upon all of the data sources 110 having full coverage (completeness). In some embodiments, however, the online data fusion system 102 computes the probabilities based without knowledge of the coverage of one or more of the data sources 110. In these embodiments, full or uniform coverage can be assumed.

The online data fusion system 102, in some embodiments, is configured to instantiate the modules 114, 116, 118, 120 in cases that all of the data sources 110 are independent and only accuracy of the data sources 110 is considered in data fusion. FIG. 5 illustrates pseudo-code for an algorithm 500 for instantiating the modules 114, 116, 118, 120 for these cases. In particular, the algorithm 500 provides S sources in decreasing order of accuracy and $\overline{D}$ queried data items as input, and returns true values for $\overline{D}$ as output. For each returned value, the algorithm 500 also returns expPr(v), minPr(v) and maxPr(v).

The truth finding module 114, in some embodiments, is configured to implement the operations indicated under the truth finding section of the pseudo-code of the algorithm 500. In particular, as the online data fusion system 102 probes a new data source, the online data fusion system 102 finds the truth based upon the already probed data sources, denoted by $\overline{S}$ in lines 8-9 of the algorithm 500. The truth finding module 114 is configured to determine how to incrementally count the votes such that the correct values can be efficiently decided upon as the online data fusion system 102 probes each new source. In cases in which all of the data sources 110 are independent, incremental vote counting is straightforward: when the online data fusion system 110 probes a new source S, the truth finding module 114 adds $C^\perp(S)$ to the vote count of the value it provides.

The probability computation module 116, in some embodiments, is configured to implement the operations indicated under the probability computation section of the pseudo-code of the algorithm 500. In particular, for each value v that has been determined to be correct, the probability computation module 116 returns an expected probability and a probability range of this value being true, as shown in line 10 of the algorithm 500.

To compute these probabilities, the probability computation module 116 considers all possible worlds that describe the possible values provided by the unseen sources S\$\bar{S}$, denoted by W(S\$\bar{S}$). For each possible world W∈W (S\$\bar{S}$), the probability is denoted by Pr(W) and by Pr(v|$\bar{S}$, W) the probability that v is true based upon data provided in the possible world. The maximum probability of v is the maximum probability computed among all possible worlds. The minimum probability of v is the minimum probability computed among all possible worlds. The expected probability of v is the sum of the probabilities that v is true in a possible world weighted.

For computing the expected probability, the maximum probability, and the minimum probability, let S be a set of data sources and $\bar{S} \subseteq S$ be the probed sources. Let v be a value for a particular data item. The expected probability of v, denoted by $\text{expPr}(v|\bar{S})$ is defined as: $\text{expPr}(v|\bar{S}) = \Sigma_{W \in W(S \backslash \bar{S})} \text{Pr}(W) \text{Pr}(v|\bar{S},W)$. The maximum probability of v, denoted by $\text{maxPr}(v|\bar{S})$ is defined as: $\text{maxPr}(v|\bar{S}) = \max_{W \in W(S \backslash \bar{S})} \text{Pr}(v|\bar{S},W)$. The minimum probability is similarly defined.

The termination module 118, in some embodiments, is configured to implement the operations indicated under the termination justification section of the pseudo-code of the algorithm 500. In particular, as the online data fusion system 102 probes the data sources 110, the results often converge before all of the data sources 110 have been probed. In such situations, it is beneficial for the online data fusion system 102 to terminate early to conserve time and resources. The termination module 118 is configured to check for each data item a termination condition and stop receiving data for the data item if the condition is satisfied, as indicated in lines 11-13 the pseuedo-code of the algorithm 500.

To guarantee that probing more sources will not change the returned value v for data item D, probing should terminate only if for each v'∈D(D), v'≠v, minPr(v)>maxPr(v'). However, satisfying this condition for each returned value is often hard. Thus, the termination condition, in some embodiments, is loosened for the value v' with the top-2 vote count according to: minPr(v)>Pr(v') (or expPr(v')). Alternatively, in some embodiments, the termination condition is loosened for the value v' according to: Pr(v) (or expPr(v))>maxPr(v'). These loosened termination conditions can lead to much faster termination, while sacrificing the quality of the results by a small amount, if at all.

The algorithm 500 assumes an ordered list of data sources as input and probes the sources in the given order. The source ordering module 120, in some embodiments, is configured to order all or a portion of the data sources 110 such that 1) the correct answers are returned as early as possible during the probing process and 2) the probing process can terminate as soon as possible. In some embodiments, to reduce the overhead at runtime, the source ordering module 120 is configured to conduct source ordering offline. For cases in which the data sources 110 are independent, the source ordering module 120 can order the sources in decreasing order of accuracy.

The probability computation module 116, in some embodiments, is configured to compute the probability for independent data sources. For computing the expected probability for independent data sources, the probability computation module 116 utilizes the following theorem: Let S be a set of independent sources, $\bar{S} \subseteq S$ be the data sources already probed by the online data fusion system 102, and v be a value for a particular data item, then $\text{expPr}(v|\bar{S}) = \text{Pr}(v|\bar{S})$.

For computing the maximum probability of value v for independent data sources, the probability computation module 116 utilizes the following theorem: Let S be a set of independent sources, $\bar{S} \subseteq S$ be the data sources already probed by the online data fusion system 102, and v be a value for a particular data item D. Let W be a possible world in which all data sources in $S \backslash \bar{S}$ provide value v on D, then $\text{maxPr}(v|\bar{S}) = \text{Pr}(v|\bar{S},W)$.

For computing the minimum probability of value v for independent data sources, the probability computation module 116 utilizes the following theorem: Let S be a set of independent sources, $\bar{S} \subseteq S$ be the data sources already probed by the online data fusion system 102, v be a value for a particular data item D, and $v_{max} = \text{argmax}_{v' \in D(D) - \{v\}} \text{Pr}(v'|\bar{S})$. Let W be a possible world in which all data sources in $S \backslash \bar{S}$ provide value $v_{max}$ on D. Then, $\text{minPr}(v|\bar{S}) = \text{Pr}(v|\bar{S},W)$.

The algorithm 500 falls short in the presence of copying. If the online data fusion system 102 probes a copier before the copied source, the online data fusion system 102 does not know if the copier and the copied source provide the same value on a data item and hence, whether the online data fusion system 102 should use the independent vote count or the dependent vote count for the copier. Moreover, ordering the data sources 110 by accuracy may not lead to fast convergence. For example, if the top-accuracy data sources have copying relationships between them, the vote counts can increase slowly as the online data fusion system 102 discounts copied values.

The following description provides two solutions for vote counting when a copier is probed earlier than the copied source: a conservative approach and a pragmatic approach. Each approach can lead to a different source-ordering strategy. The pragmatic approach most often outperforms the conservative approach. In the following description, S is a child of S' and S' is a parent of S if S copies from S'. The parent of S on the copying path from S to S' is denoted as Pa(S, S').

The conservative vote counting approach and the pragmatic vote counting approach both observe the following no-over-counting principle: for each value, among its providers that could have copying relationships on it, at any time the online data fusion system 102 applies the independent vote count for at most one data source. This principle avoids bias from copied values at any time. Pseuedo-code for performing the conservative vote counting approach and the pragmatic vote counting approach are illustrated in algorithms 600, 700 of FIGS. 6 and 7, respectively. Incremental vote counting for each approach is now described.

The conservative approach assumes that for each data item the copier provides the same value as the copied source, so the online data fusion system 102 applies its dependent vote count at the beginning, and increases the vote count if it observes a different value from the copied source. Thus, when the online data fusion system 102 probes a new source S, the vote count for S and the vote counts for copiers of S are considered. The conservative approach is detailed below.

1. Suppose S provides value v. Among its parents, S may copy from any data source that has not been probed or is observed to also provide v. The set of such parents can be denoted by P(S). Thus, the vote count of S for v is given by the following equation: $C^{-1}(S) \pi_{S_p \in P(S)} (1 - \rho(S \rightarrow S_p))$.

2. Suppose S provides a different value from its child $S_c$. Then, $S_c$ cannot copy from S and the online data fusion system 102 should increase its vote count. Let v'=v be the value provided by $S_c$ and $C(S_c)$ be $S_c$'s current vote count. The online data fusion system 102 increases the vote count of v' by the following equation:

$$\frac{C(S_c)}{1-\rho(S_c \rightarrow S)} - C(S_c) = \frac{C(S_C)\rho(S_c \rightarrow S)}{1-\rho(S_c \rightarrow S)}.$$

The conservative approach guarantees that the vote count of each value increases monotonically. However, the conservative approach may under estimate the vote count of a value if all the probed providers are copiers.

The pragmatic approach assumes that for each data item the copier provides a different value from the copied source, so the online data fusion system 102 applies its independent vote count at the beginning, and decreases the vote count when observing the same value from the copied source. The online data fusion system 102 is configured to consider both directly and transitively copied sources to avoid violation of the no-over-counting principle. Accordingly, when the online data fusion system 102 probes data source S, the online data fusion system 102 updates the vote count for the data source S and the vote count of its closest probed descendant. The pragmatic approach is detailed below.

1. Suppose S provides value v. Among its closest probed ancestors, S can copy only from those that also provide v; this is denoted by $\overline{A}$. The online data fusion system 102 computes S's vote count by the following equation:

$$C^{\perp}(S) \prod_{S_a \in \overline{A}} (1 - \rho(S \rightarrow Pa(S, S_a))).$$

2. Consider the closest probed descendant of S, denoted by $S_d$. There are two cases. First, if $S_d$ provides the same value as S and none of S's closest probed ancestors is observed to also provide v (i.e., $\overline{A}=\emptyset$), the online data fusion system 102 must have applied the independent vote count of $S_d$ (with respect to S) and need to decrease it. Let $C(S_d)$ be the current vote count of $S_d$ and $S_p=Pa(S_d,S)$. The vote count of v is decreased by the following equation:

$$C(S_d)-C(S_d)(1-\rho(S_d \rightarrow S_p))=C(S_d)\rho(S_d \rightarrow S_p).$$

This approach does not guarantee monotonicity, but applies the independent vote count to exactly one source among those that have copying relationships, so avoids over-counting and under-counting.

Continuing the example first introduced with FIG. 2, and considering probing data sources $S_1$ 200A through $S_3$ 200C in the order of $S_3$ 200C, $S_2$ 200B, $S_1$ 200A, reference is now made to FIGS. 8A and 8B, in which a conservative approach table 800 shows vote counts according to the conservative approach and a pragmatic approach table 802 shows vote counts according to the pragmatic approach. The conservative approach table 800 and the pragmatic approach table 802 each show the vote counts of NY and NJ as the online data fusion system 102 probes the data sources $S_1$ 200A through $S_3$ 200C using the respective approaches.

In the conservative approach, the online data fusion system 102 first adds the dependent vote count "1" of $S_3$ 200C for NJ, as its parent data source, $S_2$ 200B, has not been probed. Next, the online data fusion system 102 adds the dependent vote count "0.8" of $S_2$ 200B for NY. Since this value is a different value from $S_3$ 200C, the online data fusion system 102 increases the vote count of NJ by 1/0.2−1=4. Finally, the online data fusion system 102 probes $S_1$ 200A, adding "3" to the vote count of NY.

In the pragmatic approach, the online data fusion system 102 first probes $S_3$ 200C and adds 5 to the vote count for NJ. The online data fusion system 102 then probes S2 200B and adds 4 to the vote count of NY. Since $S_2$ 200B provides a different value from $S_3$ 200C, the online data fusion system 102 does not change the vote for $S_3$ 200C. Last, the online data fusion system 102 probes $S_1$ 200A, adding 3 to the vote count of NY and reducing the vote count of $S_2$ 200B by 4−4*0.2=3.2. The final vote count for each value is the same in both the approaches.

Computing the expected, maximum, and minimum probabilities for a value is more difficult when one or more copying relationships are considered. The reason for this, again, is that for a source S, the observation of whether S's parents provide the same value may change its vote count. How the expected, maximum, and minimum probabilities are efficiently approximated will now be described. Note that the estimated maximum and minimum probabilities are looser bounds and therefore still "correct" to show a user. Also note the estimated expected probability is close to the real expected probability. Moreover, the estimated expected, maximum, and minimum probabilities will also be used in termination justification without sacrificing the quality of results.

For estimating the expected probability, it is first shown that when none of the unseen data sources is a parent of a probed source, the expected probability of a value is the same as the probability computed according to the probed sources. The intuition is that among unseen data provided for the data item, data that are independently provided will not change the expected probability, for the same reason as discussion above with regard to computing the probability for independent data sources. Data that are copied will not be considered in vote counting and so also will not affect the expected probability.

The expected probability may be calculated using the following theorem: Let S be a set of sources, $\overline{S} \subseteq S$ be the probed data sources, and v be a value. If $\rho(S \rightarrow S')=0$ holds for each $S \in \overline{S}$ and $S' \in S \setminus \overline{S}$, then $\text{expPr}(v|\overline{S})=\text{Pr}(v|\overline{S})$. However, as the following example shows, if a probed source copies from an unseen data source, the above-described theorem does not hold any more.

Consider a data item D, where $D(D)=\{0,1\}$. Consider three data sources. Sources $S_1$ and $S_2$ are independent and both have accuracy 0.6; thus, $$C^{\perp}(S_1) = C^{\perp}(S_2) = \ln\frac{1*.6}{1-.6} = .4.$$

Source $S_3$ is a copier of $S_1$ with $\rho(S_3 \rightarrow S_1)=0.8$. Source $S_3$ has accuracy 0.9, so $$C^{\perp}(S_3) = \ln\frac{1*.9}{1-.9} = 2.2.$$

Suppose the online data fusion system 102 has probed $S_2$, observing value 0, and has probed $S_3$, observing value 1. The online data fusion system 102 then computes the expected probability for value 1.

The conservative approach uses the dependent vote count of $S_3$ (2.2*0.2=0.44). The probability for 1 becomes $$\frac{e^{.44}}{e^{.44}+e^{.4}} = .51,$$

so $S_1$ has probability 0.51*0.6+0.49*0.4=0.5 to provide 1. If $S_1$ provides 1, the probability for 1 becomes $$\frac{e^{.4+.44}}{e^{.4}+e^{.44+.4}} = .61.$$

Otherwise, $S_3$ cannot copy from $S_1$ so the online data fusion system 102 uses the independent vote count of $S_3$; the probability then becomes $$\frac{e^{2.2}}{e^{2.2} + e^{.4+.4}} = .8.$$

The expected probability for 1 is thus $0.61*0.5+0.8*0.5=0.71>0.51$.

The pragmatic approach uses the independent vote count of $S_3$. The probability for 1 is then $$\frac{e^{2.2}}{e^{2.2} + e^{.4}} = .86,$$

so $S_1$ has probability $0.86*0.6+0.14*0.4=0.57$ to provide 1. Similarly, the expected probability for 1 is $0.61*0.57+0.8*0.43=0.69<0.86$.

The discrepancy in the above example is because the observation of data from unseen sources will change the belief of whether the copier copies on a particular data item. The results that lead to an approximation of the expected probability are now shown.

The expected probability is approximated by the following theorem: Let $\overline{S} \subseteq S$ be a set of probed data sources such that for one and only one $\overline{S} \subseteq S$, there exists $S' \in S \setminus \overline{S}$, where $\rho(S \to S')>0$. Let v be a value of a particular data item. Let $Pr^{con}(v|\overline{S})$ (resp. $Pr^{pra}(v|\overline{S})$) denote the probability of v computed in the conservative (resp. pragmatic) approach, and $\exp Pr^{con}(v|\overline{S})$ note the expected probability in the conservative approach. Then, (similar for the pragmatic approach):

1. $Pr^{con}(v|\overline{S}) < \exp Pr^{con}(v|\overline{S}) < Pr^{pra}(v|\overline{S})$ 2. $\left| \frac{Pr^{con}(v|\overline{S}) + Pr^{pra}(v|\overline{S})}{2} - \exp Pr^{con}(v|\overline{S}) \right| < \frac{1}{4}.$ Computing the maximum or minimum probability of a value is tractable as shown by the following theorem: Given $\overline{S} \subseteq S$ and value v, computing $\max Pr(v|\overline{S})$ and $\min Pr(v|\overline{S})$ is in PTIME.

Although the online data fusion system 102 can compute a tight bound of value probability in polynomial time, the algorithm is still quite costly and not suitable for an online process. Accordingly, how to compute a loose (but still fairly tight) bound for minimum probability and how to similarly compute the maximum probability will now be described.

To minimize the probability of value v, the online data fusion system 102 minimizes C(v) and maximizes C(v') for each V'≠v. FIG. 9 illustrates pseudo-code for an algorithm 900 for doing so in four steps, described below.

1. To minimize C(v), for each of v's proved provider $S \in \overline{S}$ that 1) has an unseen parent $S_p$, and 2) satisfies $C^\perp(S) > C^\perp(S_a) + C^{\to}(S)$ for the ancestor $S_a$ that leads to the minimum $C^\perp(S_a) + C^{\to}(S)$, the online data fusion system 102 uses $C^\perp(S_a) + C^{\to}(S)$ as its vote count.

2. To maximize C(v'), V'≠v, from the probed sources, for each $S \in \overline{S}$. that does not provide v and has an unseen parent, the online data fusion system 102 uses the independent vote count $C^\perp(S)$.

3. Let $v_{max}$ be the value with the highest vote count among all values other than v after step 2. To maximize $C(v_{max})$ from unseen sources, the online data fusion system 102 assumes the unseen sources all provide $v_{max}$ independently and use their independent vote count.

4. Compute the probability of v accordingly.

Let S be a set of sources, $\overline{S} \subseteq S$ be the probed sources, v be a value, and $f_a$ be the maximum number of ancestor a source has. The algorithm 900 finishes in time $O(f_a|\overline{S}|)$ and its result M satisfies $M \leq \min Pr(v|\overline{S})$. An example using the algorithm 900 will now be described.

Consider the data sources $S_1$ 200A-$S_9$ 200I illustrated and described above with reference to FIG. 2 and assume the online data fusion system 102 has probed all of the data sources $S_1$ 200A-$S_9$ 200I except $S_8$ 200H. Consider the minimum probability of NJ. Steps 1 and 2 will not change vote count of any probed source. Step 3 assumes $S_8$ 200H also provides TX and uses its independent vote count 4. Thus, $$\min Pr(NJ \mid S \setminus \{S_8\}) = \frac{e^{10.8}}{e^{10.8} + e^{7+4} + e^{3.8} + e^0 * 47} = .45.$$

At this time, the online data fusion system 102 can compute a probability of 0.02 for the top-2 value TX. If the online data fusion system 102 uses the termination condition $\min Pr(NJ) > Pr(TX)$, the online data fusion system 102 can terminate.

Pseudo-code for a full online data fusion algorithm 1000 is shown in FIG. 10. The algorithm 1000 summarizes the techniques described above regarding vote counting a probability computation. Each round takes time $O(f_a|\overline{S}||\overline{D}|)$. Note however that in early rounds, the online data fusion system 102 has not yet probed many data sources and $|\overline{S}|$ is small, and in late rounds, the number of remaining data items is often much less than $|\overline{D}|$.

Ordering of sources according to the two vote counting approaches will now be described. The source ordering module 120, in some embodiments, is configured to perform operations for source ordering. A source can have different vote counts for different values under consideration of copying. The source ordering module 120, in some embodiments, orders the data sources 110 by their minimum vote counts, which can be obtained in the extreme case where all of the data sources 110 provide the same value. (The maximum vote count is the independent vote count.)

According to the conservative approach for source ordering, when all sources provide the same value, the vote count of a source is fixed as its dependent vote count. Let S be a source and $\overline{P}_a(S)$ be its parents. Then, the fixed vote count of S is computed by the equation: $C(S) = C^\perp(S) \pi_{S_p \in \overline{P}_a(S)}(1-\rho(S \to S_p))$. The source ordering module 120 orders the data sources 110 in decreasing order according to the fixed vote count. As a result, an independent data source is often ordered before its copier, even if the copier has a higher accuracy.

According to the pragmatic approach for source ordering, when all sources provide the same value, as the online data fusion system 102 probes a new source, the vote count of its probed descendants may need to be decreased. Thus, in some embodiments, the source ordering module 120 orders the sources iteratively, each time choosing the data source that increases the total vote count most. In particular, given a source S and a set of probed sources $\overline{S}$, the online data fusion system 102 computes the conditional vote count of S by the equation: $C(S|\overline{S}) = C(\overline{S} \cup \{S\}) - C(\overline{S})$, where $C(\overline{S})$ denotes the total vote count of $\overline{S}$ if all sources in $\overline{S}$ provide the same value. In other words, $C(\overline{S} \cup \{S\})$ serves as an invariant for deciding $C(S|\overline{S})$. The online data fusion system 102 computes $C(\overline{S})$ as follows: for each $S \in \overline{S}$, if S has an ancestor in $\overline{S}$, the online data fusion system 102 considers S may (directly or transitively) copy from its ancestor and take its dependent vote count.

Otherwise, the online data fusion system 102 considers S provides the value independently and takes its independent vote count. An example of this is provided below.

Referring yet again to the data sources $S_1$ 200A-$S_9$ 200I illustrated in FIG. 2, first consider $S_2$ 200B and $\overline{S}=\{S_3\}$. $C(\overline{S})=5$, $C(\overline{S}\cup\{S_2\})=4+5*0.2=5$, so $C(S_2|\overline{S})=5-5=0$. Now consider $S_1$ 200A and $\overline{S'}=\{S_2,S_3\}$ (transitive copying). $C(\overline{S'})=5$, $C(\overline{S'}\cup\{S_1\})=3+4*0.2+5*0.2=4.8$, so $C(S_1|\overline{S'})=4.8-5=-0.2$. Next consider $S_4$ and $\overline{S''}=\{S_5,S_6\}$ (multi-source copying). $C(\overline{S''})=5+4*0.2=5.8$, $C(S''\cup\{S_4\})=3+5+4*0.2*0.2=8.16$, so $C(S_4|\overline{S''})=8.16-5.8=2.36$.

As shown in the above-described example, when S is a parent of a probed copier $S_c$ and has lower accuracy than $S_c$, $C(S|\overline{S})$ can be negative. This is due to the assumption that the accuracy of the copied data is the same as that of the copied source, which can be much lower than that of the copier. This negative vote count can put S to the end of the ordered list, which may be desired because of its low accuracy and its dependence upon $S_c$. Note, however, that such a vote counting strategy can fall short in the presence of co-copying. In FIG. 2, if the online data fusion system 102 probes $S_8$ 200H and $S_9$ 200I before $S_7$ 200G, the total vote count is 4+5=9, violating the no-over-counting principle described above. Thus, the independent vote count should only be applied for $S_8$ 200H or $S_9$ 200I, but different choices can lead to different results. In some embodiments, a solution to this is to guarantee that the online data fusion system 102 never probes two co-copiers if none of their common ancestors is probed. This condition can be formalized as now detailed below.

Let S and S' be two sources where neither source is the ancestor of the other. For each source's closest ancestor $S_a$, the online data fusion system 102 probes $S_a$ or one of its ancestors before both S and S' are probed. Accordingly, an illustrative source ordering algorithm proceeds in four steps.
1. Initialize $S=\emptyset$ and set $C(S|\overline{S})=C^1(S)$ for each S.
2. Among the sources that satisfy the co-copier condition, select the source with the highest vote count and add it to $\overline{S}$.
3. Adjust the conditional vote count for unselected sources.
4. Got to Step 2, until all sources are selected (i.e., $\overline{S}=S$).

Pseudo-code for a source ordering algorithm 1100 is shown in FIG. 11. The source ordering algorithm 1100 takes time $O(f^2|S|^2)$, where f is the maximum number of ancestors and descendants a source has. This is reasonable for embodiments in which source ordering is conducted offline and since the number of sources for a particular domain is rarely huge.

Pragmatic source ordering has the advantage of often ordering high-accuracy sources early and meanwhile taking copying into consideration. The following example illustrates a benefit of pragmatic source ordering.

Consider ordering the sources in FIG. 2. Referring to FIG. 12, a table 1200 shows the fixed vote counts and the condition vote counts the online data fusion system 102 has computed in each round, and the source ordering module 120 of the online data fusion system 102 orders the sources accordingly (pragmatic ordering randomly chooses $S_5$ 200E first among the sources that have a tie). Note that in the pragmatic approach, although $S_8$ 200H has a higher conditional vote count than $S_7$ 200G, $S_8$ 200H is ranked later because otherwise the co-copier condition would be violated.

The pragmatic order yields better results as it ranks the most accurate sources earlier even if some of the sources are copiers. Indeed, if the conservative order is used, the result will not converge to NJ until the online data fusion system 102 has probed six of the sources $S_1$ 200A-$S_9$ 200I. In contrast, using the pragmatic order, the online data fusion system 102 only needs to probe three of the sources $S_1$ 200A-$S_9$ 200I.

Figure 13:
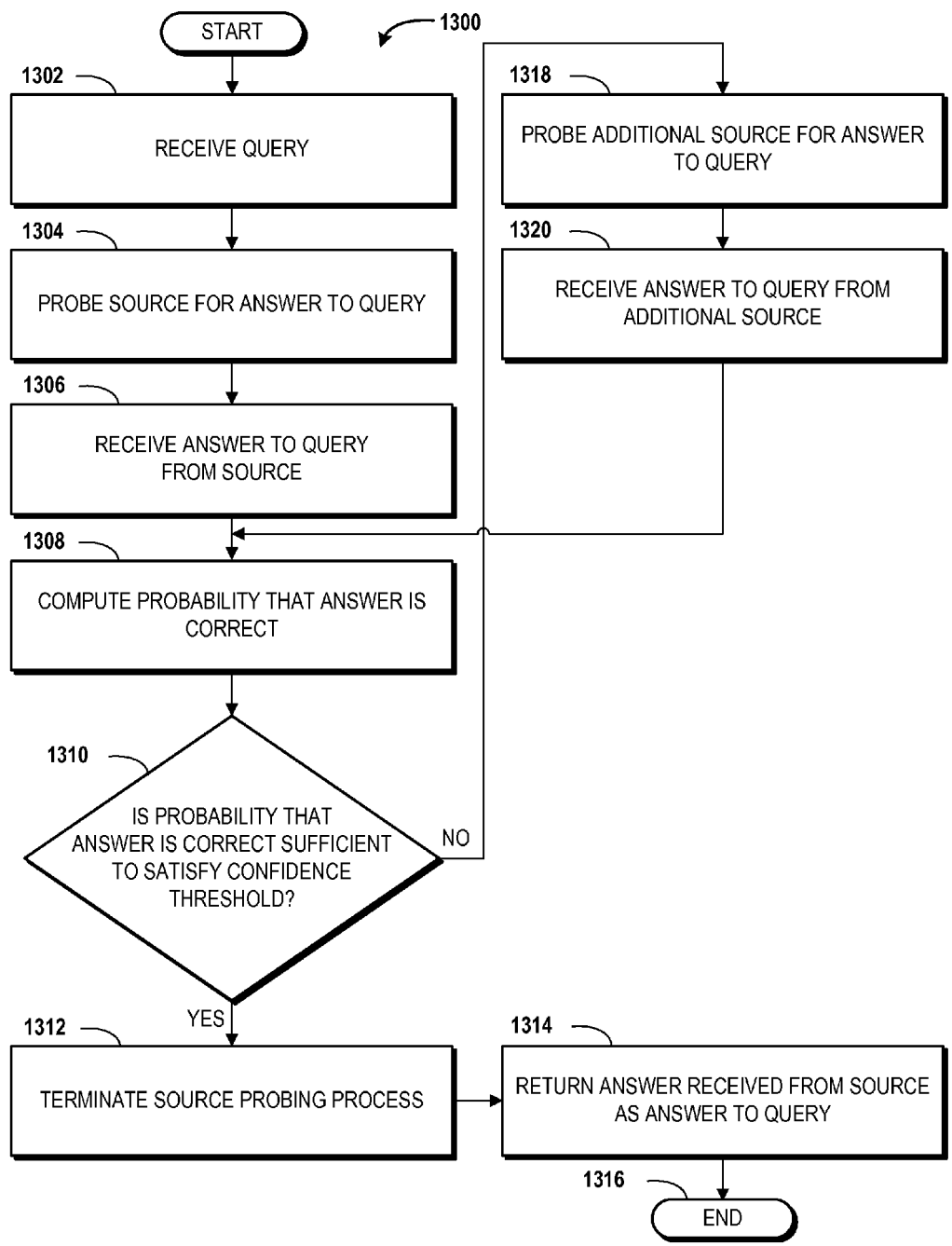
FIG. 13 is a flow diagram showing aspects of a method for resolving conflicts using an online data fusion system, according to an illustrative embodiment.

Turning now to FIG. 13, a method 1300 for resolving conflicts using the online data fusion system 102 will be described, according to an illustrative embodiment. The method 1300 provides an illustrative overview for the online data fusion process described above. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, wireless devices, mobile devices, minicomputers, mainframe computers, personal computers, hand-held computing devices, processor-based, programmable consumer electronics, combinations thereof, and the like. In particular, computer-readable instructions can be implemented on the online data fusion system 102. In some embodiments, computer-readable instructions are implemented on one or more of the modules 114, 116, 118, 120.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 1300 begins and proceeds to operation 1302, wherein the online data fusion system 102 receives a query, such as the query 106 illustrated in FIG. 1. In response to receiving the query 106, at operation 1304, the online data fusion system 102 probes a data source, such as one of the data sources 110, for an answer to the query 106. From operation 1304, the method 1300 proceeds to operation 1306, wherein the online data fusion system 102 receives an answer to the query 106 from the probed data source. From operation 1306, the method 1300 proceeds to operation 1308, wherein the online data fusion system 102 computes a probability that the answer is correct. From operation 1308, the method 1300 proceeds to operation 1310, wherein the online data fusion system 102 determines if the probability that the answer is correct is sufficient to satisfy a confidence threshold.

If the online data fusion system 102 determines, at operation 1310, that it has enough confidence in the answer received from the source (i.e., the confidence threshold has at least been met), then the method 1300 proceeds to operation 1312. At operation 1312, the online data fusion system 102 terminates the source probing process. The method 1300 then proceeds to operation 1314, wherein the online data fusion system 102 returns an answer received from a source as the answer to the query 106. The method 1300 then proceeds to operation 1316. The method 1300 ends at operation 1316.

If the online data fusion system 102 determines, at operation 1310, that it does not have enough confidence in the answer received from the source (i.e., the confidence threshold has not been met), then the method 1300 proceeds to operation 1318, wherein the online data fusion system 102 probes an additional data source for an answer to the query 106. From operation 1318, the method 1300 proceeds to operation 1320, wherein the online data fusion system 102 receives an answer to the query 106 from the additional source. The method then proceeds to operation 1308, wherein the online data fusion system 102 computes a probability that the additional answer is correct. From operation 1308, the method 1300 proceeds to operation 1310, wherein the online data fusion system 102 determines if the probability that the answer is correct is sufficient to satisfy a confidence threshold. The method 1300 then continues to either operation 1312 or operation 1318, as described above. The method 1300 continues until the online data fusion system 102 has enough confidence in some answer received from a data source to terminate the source probing process and return the selected answer.

Figure 14:
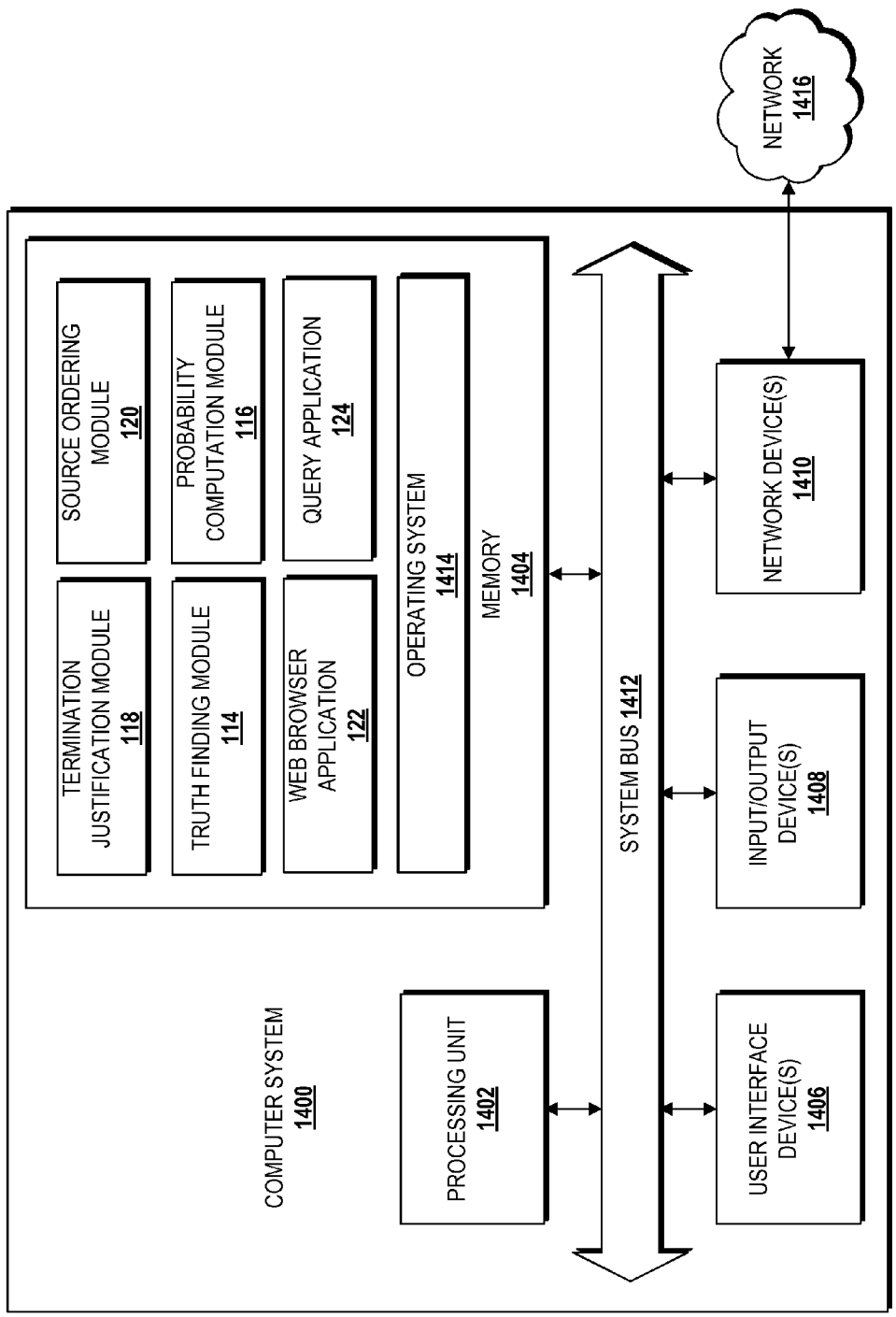
FIG. 14 is a computer architecture diagram illustrating an illustrative computer hardware and software architecture for a computing system capable of implementing aspects of the embodiments presented herein.

FIG. 14 is a block diagram illustrating a computer system 1400 configured to perform various operations disclosed herein. The online data fusion system 102 and/or the query system 108, described herein above with respect to FIG. 1, in some embodiments, are configured like the computer system 1400. Accordingly, the computer system 1400 illustrates the various modules and applications described above with reference to FIG. 1. It should be understood, however, that these modules and applications are applicable to the respective systems as described above and are shown together here for ease of illustration.

The computer system 1400 includes a processing unit 1402, a memory 1404, one or more user interface devices 1406, one or more input/output ("I/O") devices 1408, and one or more network devices 1410, each of which is operatively connected to a system bus 1412. The bus 1412 enables bi-directional communication between the processing unit 1402, the memory 1404, the user interface devices 1406, the I/O devices 1408, and the network devices 1410.

The processing unit 1402 may be a standard central processor that performs arithmetic and logical operations, a more specific purpose programmable logic controller ("PLC"), a programmable gate array, or other type of processor known to those skilled in the art and suitable for controlling the operation of the computer system 1400. Processing units are generally known, and therefore are not described in further detail herein.

The memory 1404 communicates with the processing unit 1402 via the system bus 1412. In some embodiments, the memory 1404 is operatively connected to a memory controller (not shown) that enables communication with the processing unit 1402 via the system bus 1412. The illustrated memory 1404 includes an operating system 1414, the web browser application 122, the query application 124, the truth finding module 114, the probability computation module 116, the termination justification module 118, and the source ordering module 120.

The operating system 1414 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 1406 may include one or more devices with which a user accesses the computer system 1400. The user interface devices 1406 may include, but are not limited to, computers, servers, personal digital assistants, telephones (e.g., cellular, IP, or landline), or any suitable computing devices. The I/O devices 1408 enable a user to interface with the program modules. In one embodiment, the I/O devices 1408 are operatively connected to an I/O controller (not shown) that enables communication with the processing unit 1402 via the system bus 1412. The I/O devices 1408 may include one or more input devices, such as, but not limited to, a keyboard, a mouse, or an electronic stylus. Further, the I/O devices 1408 may include one or more output devices, such as, but not limited to, a display screen or a printer.

The network devices 1410 enable the computer system 1400 to communicate with other networks or remote systems via a network 1416, such as the network 104 described above with reference to FIG. 1 or some other network. Examples of the network devices 1410 include, but are not limited to, a modem, a radio frequency ("RF") or infrared ("IR") transceiver, a telephonic interface, a bridge, a router, or a network card. The network 1416 may include a wireless network such as, but not limited to, a WLAN such as a WI-FI network, a WWAN, a wireless personal area network ("WPAN") such as BLUETOOTH, or a wireless metropolitan area network ("WMAN"). Alternatively, the network 1416 may be a wired network such as, but not limited to, a wide area network ("WAN") such as the Internet, a local area network ("LAN") such as the Ethernet, a wired personal area network ("PAN"), or a wired metropolitan area network ("MAN").

The network 1416 embodied as a cellular network may utilize a mobile telecommunications technology such as, but not limited to, Global System for Mobile communications ("GSM"), Universal Mobile Telecommunications System ("UMTS"), Code Division Multiple Access ("CDMA") ONE, CDMA2000, Long-Term Evolution ("LTE"), and various other 2G, 2.5G, 3G, 4G, and greater generation mobile telecommunications technologies. In addition, mobile data communications technologies such as General Packet Radio Service ("GPRS"), Enhanced Data Rates for GSM Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), HSPA+, and various other current and future mobile data communications technologies are contemplated for use by the network 1416. Therefore, the embodiments presented herein should not be construed as being limited to a particular mobile telecommunications technology and/or standards utilizing such technologies.

As used herein, communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by one or more of the systems disclosed herein, such as the online data fusion system 102 and/or the query system 108. For purposes of the claims, the phrase "computer storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for online data fusion have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A method comprising:
    receiving, by an online data fusion system comprising a processor, answers to a query from at least two probed sources in response to probing the at least two probed sources;
    computing, by the processor of the online data fusion system, a probability that each answer of the answers is correct based, at least in part, upon a copying relationship between at least two of the at least two probed sources, wherein computing the probability that each answer of the answers is correct comprises
        computing, by the processor, an expected probability, a maximum probability, and a minimum probability that each answer of the answers is correct, and
        refreshing, by the processor, the expected probability, the maximum probability, and the minimum probability of a first answer of the answers from a first probed source of the at least two probed sources based, at least in part, on a second answer received from a second probed source of the at least two probed sources as the second answer is received from the second probed source of the at least two probed sources;
    when the online data fusion system gains enough confidence that, based upon the probability that each answer of the answers is correct, probing an additional source is unlikely to change the first answer, terminating, by processor, probing without probing the additional source; and
    providing, by the processor of the online data fusion system, the first answer of the answers in response to the query.

2. The method of claim 1, wherein computing the probability that each answer of the answers is correct comprises computing the probability that each answer of the answers is correct further based upon a source quality of the first probed source of the at least two probed sources.

3. The method of claim 2, wherein computing the probability that each answer of the answers is correct comprises computing the probability that each answer of the answers is correct further based upon a coverage of the first probed source of the at least two probed sources.

4. The method of claim 1, wherein computing the probability that each answer of the answers is correct comprises computing the probability that each answer of the answers is correct further based upon a coverage of the first probed source of the at least two probed sources.

5. The method of claim 1, wherein computing the probability that each answer of the answers is correct comprises computing the probability that each answer of the answers is correct further based upon an answer expected from the additional source that is unprobed considering a copying relationship between the additional source and the first probed source of the at least two probed sources.

6. The method of claim 1, further comprising receiving, using the online data fusion system, an ordered list of sources specifying an order in which to probe the at least two probed sources.

7. The method of claim 1, wherein terminating probing without probing the additional source when the online data fusion system gains enough confidence that probing the additional source is unlikely to change the answers comprises terminating probing without probing the additional source when a termination condition is satisfied.

8. A computer storage medium comprising computer-executable instructions which, when executed by a computer, cause the computer to perform operations comprising:
   receiving, in response to probing at least two probed sources, answers to a query from the at least two probed sources;
   computing a probability that each answer of the answers is correct based, at least in part, upon a copying relationship between at least two of the at least two probed sources, wherein computing the probability that each answer of the answers is correct comprises
      computing an expected probability, a maximum probability, and a minimum probability that each answer of the answers is correct, and
      refreshing the expected probability, the maximum probability, and the minimum probability of a first answer of the answers from a first probed source of the at least two probed sources based, at least in part, on a second answer received from a second probed source of the at least two probed sources as the second answer is received from the second probed source of the at least two probed sources;
   when the online data fusion system gains enough confidence that, based upon the probability that each answer of the answers is correct, probing an additional source is unlikely to change the first answer, terminating probing without probing the additional source; and
   providing the first answer of the answers in response to the query.

9. The computer storage medium of claim 8, wherein computing the probability that each answer of the answers is correct comprises computing the probability that each answer of the answers is correct further based upon at least one of the following:
   a source quality of the first probed source of the at least two probed sources; or
   a coverage of the first probed source of the at least two probed sources.

10. The computer storage medium of claim 8, wherein computing the probability that each answer of the answers is correct comprises computing the probability that each answer of the answers is correct based upon an answer expected from the additional source that is unprobed considering a copying relationship between the additional source and the first probed source of the at least two probed sources.

11. The computer storage medium of claim 8, wherein computing the probability that each answer of the answers is correct comprises computing the probability that each answer of the answers is correct without knowledge of a quality of a probed source of the at least two probed sources.

12. The computer storage medium of claim 8, wherein the operations further comprise receiving an ordered list of sources specifying an order in which to probe the at least two probed sources.

13. The computer storage medium of claim 8, wherein terminating probing without probing the additional source when the online data fusion system gains enough confidence that probing the additional source is unlikely to change the answers comprises terminating probing without probing the additional source when a termination condition is satisfied.

14. The computer storage medium of claim 8, wherein computing the probability that each answer of the answers is correct comprises computing the probability that each answer of the answers is correct further based upon a source quality of the first probed source of the at least two probed sources and a coverage of the first probed source of the at least two probed sources.

15. An online data fusion system comprising:
   a processor; and
   a memory that stores instructions which, when executed by the processor, cause the processor to perform operations comprising
      receiving, in response to probing at least two probed sources, answers to a query from the at least two probed sources,
      computing a probability that each answer of the answer is correct based, at least in part, upon a copying relationship between at least two of the at least two probed sources, wherein computing the probability that each answer of the answers is correct comprises
         computing an expected probability, a maximum probability, and a minimum probability that each answer of the answers is correct, and
         refreshing the expected probability, the maximum probability, and the minimum probability of a first answer of the answers from a first probed source of the at least two probed sources based, at least in part, on a second answer received from a second probed source of the at least two probed sources as the second answer is received from the second probed source of the at least two probed sources,
      when the online data fusion system gains enough confidence that, based upon the probability that each answer of the answers is correct, probing an additional source is unlikely to change the first answer, terminating probing without probing the additional source, and
      providing the first answer of the answers in response to the query.

16. The online data fusion system of claim 15, wherein computing the probability that each answer of the answers is correct comprises computing the probability that each answer of the answers is correct further based upon at least one of the following:
   a source quality of the first probed source of the at least two probed sources; or
   a coverage of the first probed source of the at least two probed sources.

17. The online data fusion system of claim 15, wherein the operations further comprise generating an ordered list of sources specifying an order in which to probe the at least two probed sources, the ordered list of sources being based upon at least one of the following:
   the copying relationship between the at least two of the at least two probed sources;
   a source quality of the first probed source of the at least two probed sources; or
   a coverage of the first probed source of the at least two probed sources.

18. The online data fusion system of claim 15, wherein computing the probability that each answer of the answers is correct comprises computing the probability that each answer of the answers is correct further based upon an answer expected from the additional source that is unprobed considering a copying relationship between the additional source and the first probed source of the at least two probed sources.

19. The online data fusion system of claim 15, wherein terminating probing without probing the additional source when the online data fusion system gains enough confidence that probing the additional source is unlikely to change the answers comprises terminating probing without probing the additional source when a termination condition is satisfied.

20. The online data fusion system of claim 15, wherein computing the probability that each answer of the answers is correct comprises computing the probability that each answer of the answers is correct further based upon a source quality of the first probed source of the at least two probed sources and a coverage of the first probed source of the at least two probed sources.

\* \* \* \* \*